United States Patent
Sudbrink et al.

(10) Patent No.: US 10,512,205 B2
(45) Date of Patent: *Dec. 24, 2019

(54) AGRICULTURAL TILLAGE IMPLEMENT WHEEL CONTROL

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/452,399

(22) Filed: Mar. 7, 2017

(65) Prior Publication Data

US 2017/0172053 A1 Jun. 22, 2017

Related U.S. Application Data

(62) Division of application No. 14/532,563, filed on Nov. 4, 2014, now Pat. No. 9,622,400.

(60) Provisional application No. 61/903,492, filed on Nov. 13, 2013.

(51) Int. Cl.
| | |
|---|---|
| *A01B 73/04* | (2006.01) |
| *A01B 63/32* | (2006.01) |
| *A01B 29/00* | (2006.01) |
| *A01B 31/00* | (2006.01) |
| *A01B 49/02* | (2006.01) |

(52) U.S. Cl.
CPC ............ *A01B 73/046* (2013.01); *A01B 63/32* (2013.01); *A01B 73/044* (2013.01); *A01B 73/048* (2013.01); *A01B 29/00* (2013.01); *A01B 31/00* (2013.01); *A01B 49/027* (2013.01)

(58) Field of Classification Search
CPC ........ A01B 73/02; A01B 73/04; A01B 73/044
USPC ..................................... 172/1, 2, 459, 456
See application file for complete search history.

(56) References Cited

U.S. PATENT DOCUMENTS

| | | | |
|---|---|---|---|
| 3,791,673 A | 2/1974 | Hornung | |
| 4,178,009 A * | 12/1979 | Worick | A01B 73/044 172/311 |
| 4,324,296 A | 4/1982 | Schenk | |
| 5,427,182 A * | 6/1995 | Winter | A01B 63/22 172/2 |

(Continued)

*Primary Examiner* — Gary S Hartmann
(74) *Attorney, Agent, or Firm* — Rebecca L. Henkel; Rickard K. DeMille

(57) ABSTRACT

An agricultural tillage implement includes a main section including a hitch extending in a travel direction, a plurality of foldable wing sections coupled with the main section, a plurality of ground engaging tilling elements, a plurality of wheel assemblies and a control system. The tilling elements are coupled to the main section and wing sections. Each of the wheel assemblies include an actuator. The wheel assemblies include a first plurality of wheel assemblies associated with the main section and a second plurality of wheel assemblies associated with the plurality of wing sections. The actuators of the first plurality of wheel assemblies being independent of the actuators of the second plurality of wheel assemblies. The control system is configured to actuate the actuators to effect a profile minimizing operation of the foldable wing sections when the implement is being transitioned into a transport mode.

4 Claims, 10 Drawing Sheets

(56) References Cited

U.S. PATENT DOCUMENTS

| | | | |
|---|---|---|---|
| 6,167,972 B1 * | 1/2001 | Hundeby | A01B 63/32 172/501 |
| 6,321,850 B2 * | 11/2001 | Friggstad | A01B 73/02 172/322 |
| 6,371,215 B2 * | 4/2002 | Friggstad | A01B 73/065 172/311 |
| 6,371,216 B1 * | 4/2002 | Friggstad | A01B 73/02 172/322 |
| 6,374,921 B1 * | 4/2002 | Friggstad | A01B 73/065 172/311 |
| 6,374,923 B1 * | 4/2002 | Friggstad | A01B 73/00 172/383 |
| 6,902,010 B2 | 6/2005 | Shoup | |
| 7,581,597 B2 * | 9/2009 | Neudorf | A01B 73/02 172/1 |
| 8,215,413 B2 | 7/2012 | Friggstad | |
| 8,776,908 B2 | 7/2014 | Maro | |
| 8,833,481 B2 | 9/2014 | Blunier | |
| 9,462,739 B2 * | 10/2016 | Naylor | A01B 73/046 |
| 9,596,800 B2 * | 3/2017 | Sudbrink | A01B 73/044 |
| 9,615,500 B2 * | 4/2017 | Sudbrink | A01B 63/32 |
| 9,622,400 B2 * | 4/2017 | Sudbrink | A01B 73/046 |
| 2013/0199807 A1 * | 8/2013 | Hoffman | A01B 49/027 172/1 |
| 2015/0129251 A1 | 5/2015 | Sudbrink | |
| 2015/0129254 A1 | 5/2015 | Sudbrink | |
| 2015/0129255 A1 | 5/2015 | Sudbrink | |
| 2016/0212928 A1 | 7/2016 | Wileniec | |
| 2016/0212929 A1 | 7/2016 | Wileniec | |

* cited by examiner

AGRICULTURAL TILLAGE IMPLEMENT WHEEL CONTROL

CROSS REFERENCE TO RELATED APPLICATIONS

This is a non-provisional divisional application based upon U.S. non-provisional patent application Ser. No. 14/532,563, entitled "AGRICULTURAL TILLAGE IMPLEMENT WHEEL CONTROL", filed Nov. 4, 2014, which is based upon U.S. provisional patent application Ser. No. 61/903,492, entitled "AGRICULTURAL TILLAGE IMPLEMENT WHEEL CONTROL", filed Nov. 13, 2013, both of which are incorporated herein by reference in their entirety.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks.

Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

Wheels are often integral with tillage implements and are used for both transportation of the implement, and for depth control of the tillage elements. The prior art includes control systems that raise and lower the wheel assemblies as an entire unit, which can result in interference with components of foldable wing sections as the wing sections are folded.

What is needed in the art is an easy to use mechanism that prevents interference from occurring between implement sections.

SUMMARY OF THE INVENTION

The present invention provides a tillage implement that has several tilling sections with the ability to independently control the wheel extensions of the various sections as the sections are being folded.

The invention in one form is directed to an agricultural tillage implement that includes a main section having a hitch extending in a travel direction, a plurality of foldable wing sections coupled with the main section, a plurality of ground engaging tilling elements, a plurality of wheel assemblies and a control system. The tilling elements are coupled to the main section and wing sections. Each of the wheel assemblies include an actuator. The wheel assemblies include a first plurality of wheel assemblies associated with the main section and a second plurality of wheel assemblies associated with the plurality of wing sections. The actuators of the first plurality of wheel assemblies being independent of the actuators of the second plurality of wheel assemblies. The control system is configured to actuate the actuators to effect a profile minimizing operation of the foldable wing sections when the implement is being transitioned into a transport mode.

The invention in another form is directed to a control system of an agricultural tillage implement. The implement has a main section including a pull hitch extending in a travel direction, a plurality of foldable wing sections coupled with the main section and a plurality of wheel assemblies, each of the sections having at least one tilling element that is engageable with the ground. The control system includes a controller and a plurality of actuators. At least one actuator is associated with each of the wheel assemblies. The plurality of wheel assemblies include a first plurality of wheel assemblies associated with the main section and a second plurality of wheel assemblies associated with the plurality of wing sections. The actuators of the first plurality of wheel assemblies are controlled independently of the actuators of the second plurality of wheel assemblies by the controller. The controller is configured to actuate the actuators to effect a profile minimizing operation of the foldable wing sections when the implement is being transitioned into a transport mode.

The invention in yet another form is directed to a method of controlling profile heights of a plurality of sections of tilling assemblies of an agricultural implement. The method includes the step of independently actuating a plurality of actuators to effect a profile minimizing operation of the foldable wing sections when the implement is being transitioned into a transport mode.

An advantage of the present invention is that the implement has a decreased profile in the transport mode.

Another advantage of the present invention is that the control system precludes a manual extension of the wheel assemblies of a folded wing section.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
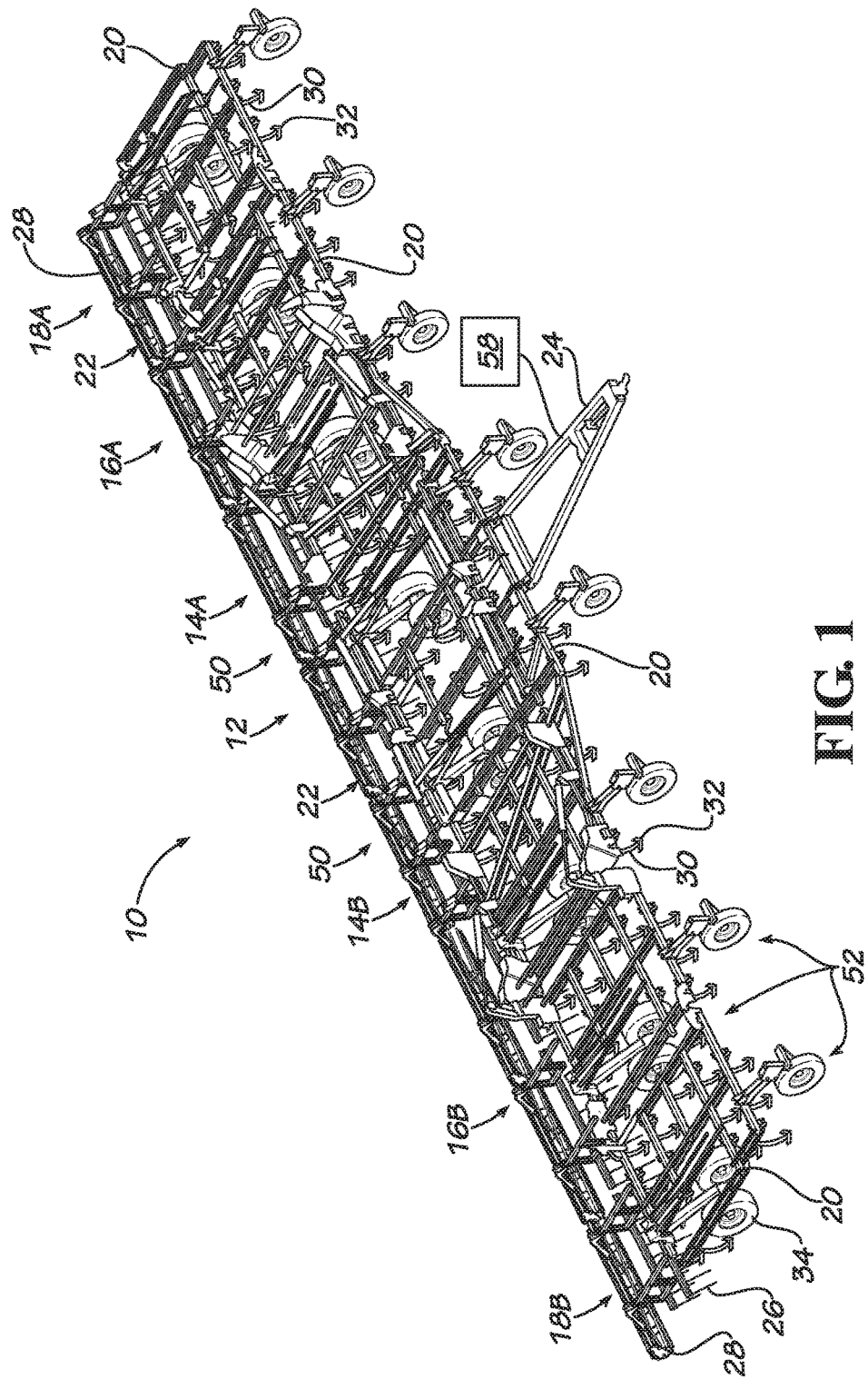
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a center frame section 12, also referred herein as a main section 12, and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Figure 2:
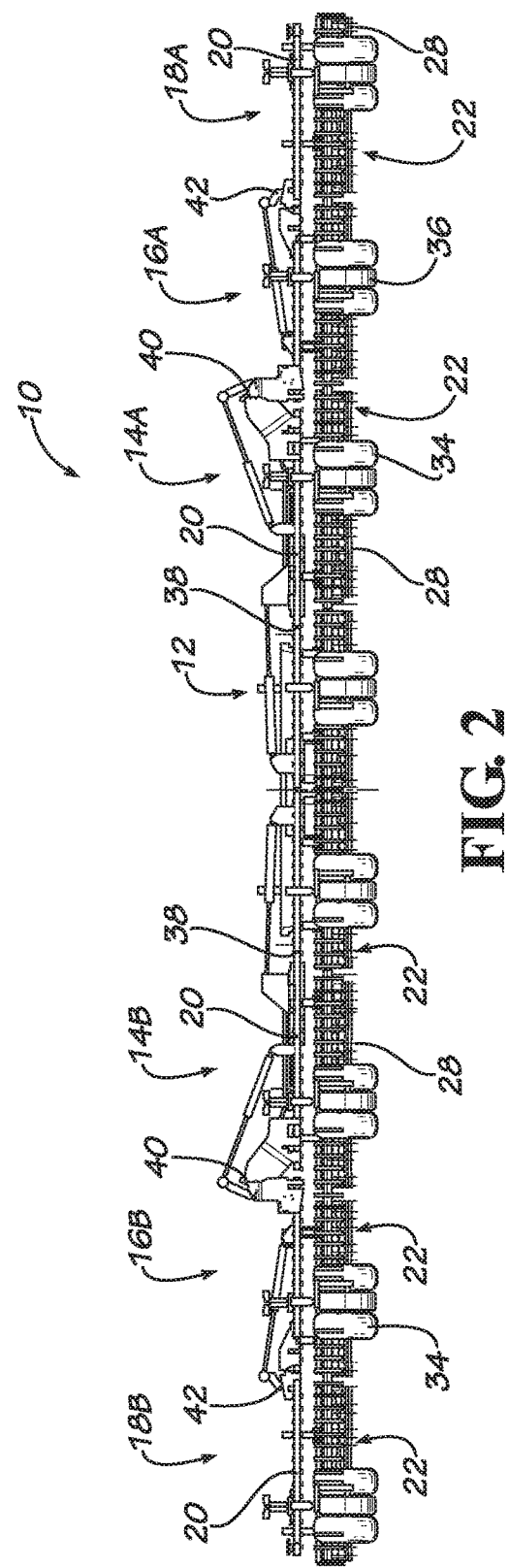
FIG. 2 is a front view of the field cultivator shown in FIG. 1.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 3:
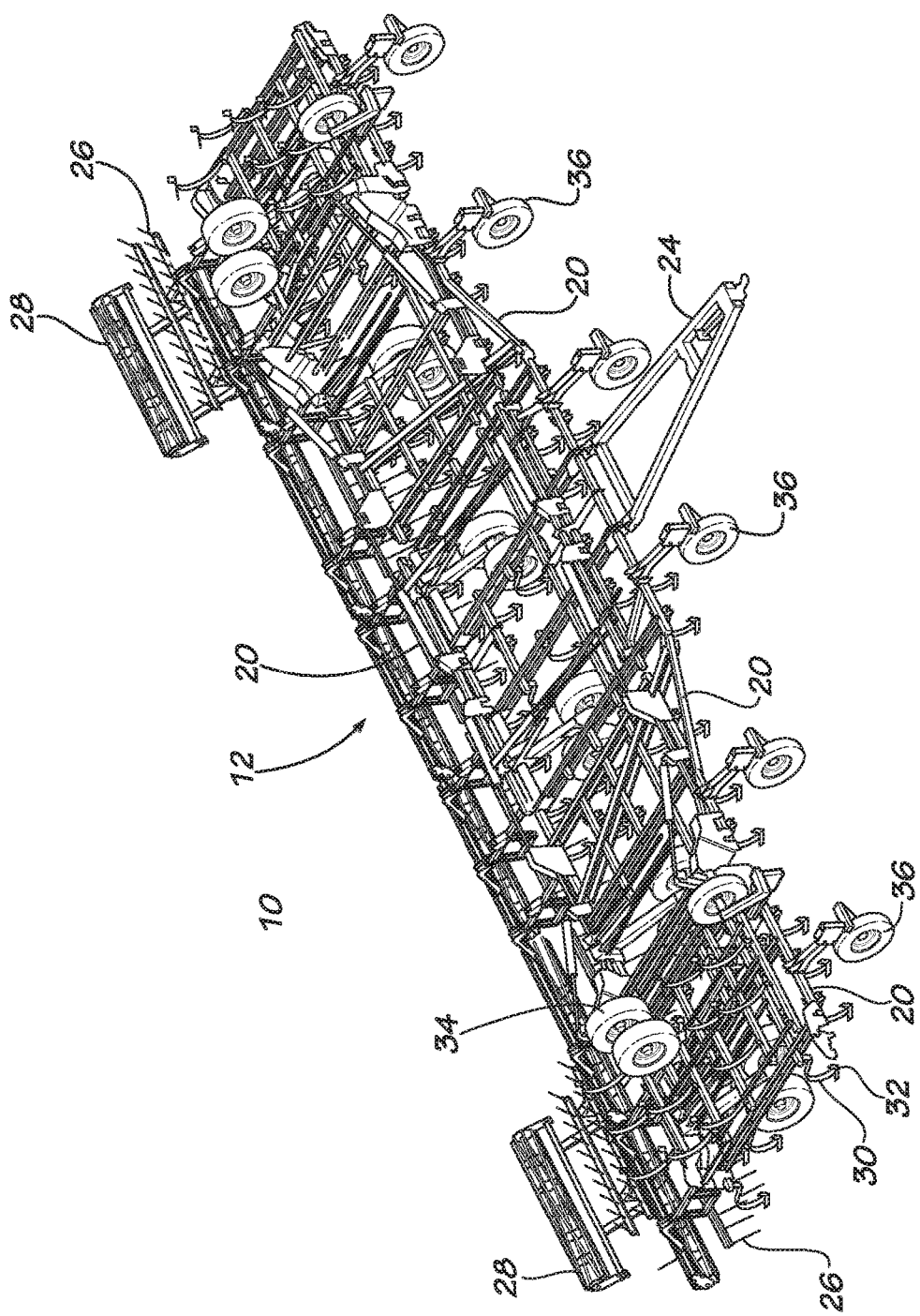
FIG. 3 is a top perspective view of the field cultivator shown in FIGS. 1-2, with the outer wing sections folded to a transport position.
Figure 4:
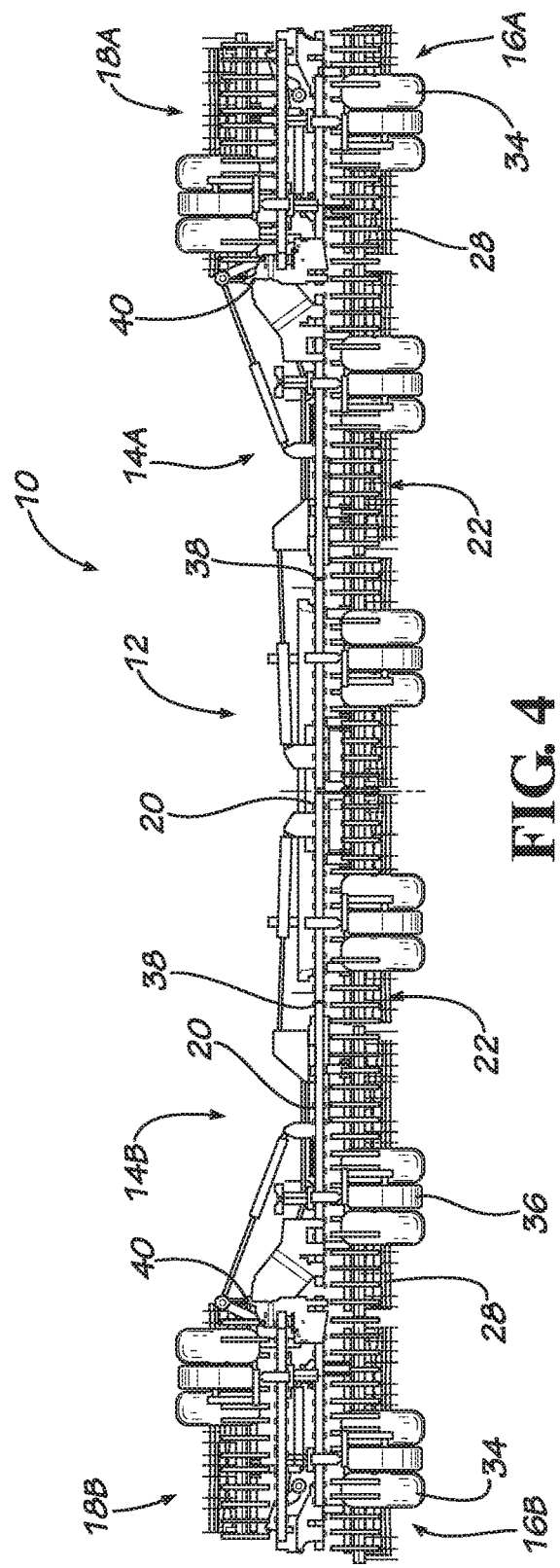
FIG. 4 is a front view of the field cultivator shown in FIG. 3, with the outer wing sections folded to the transport position.
Figure 5:
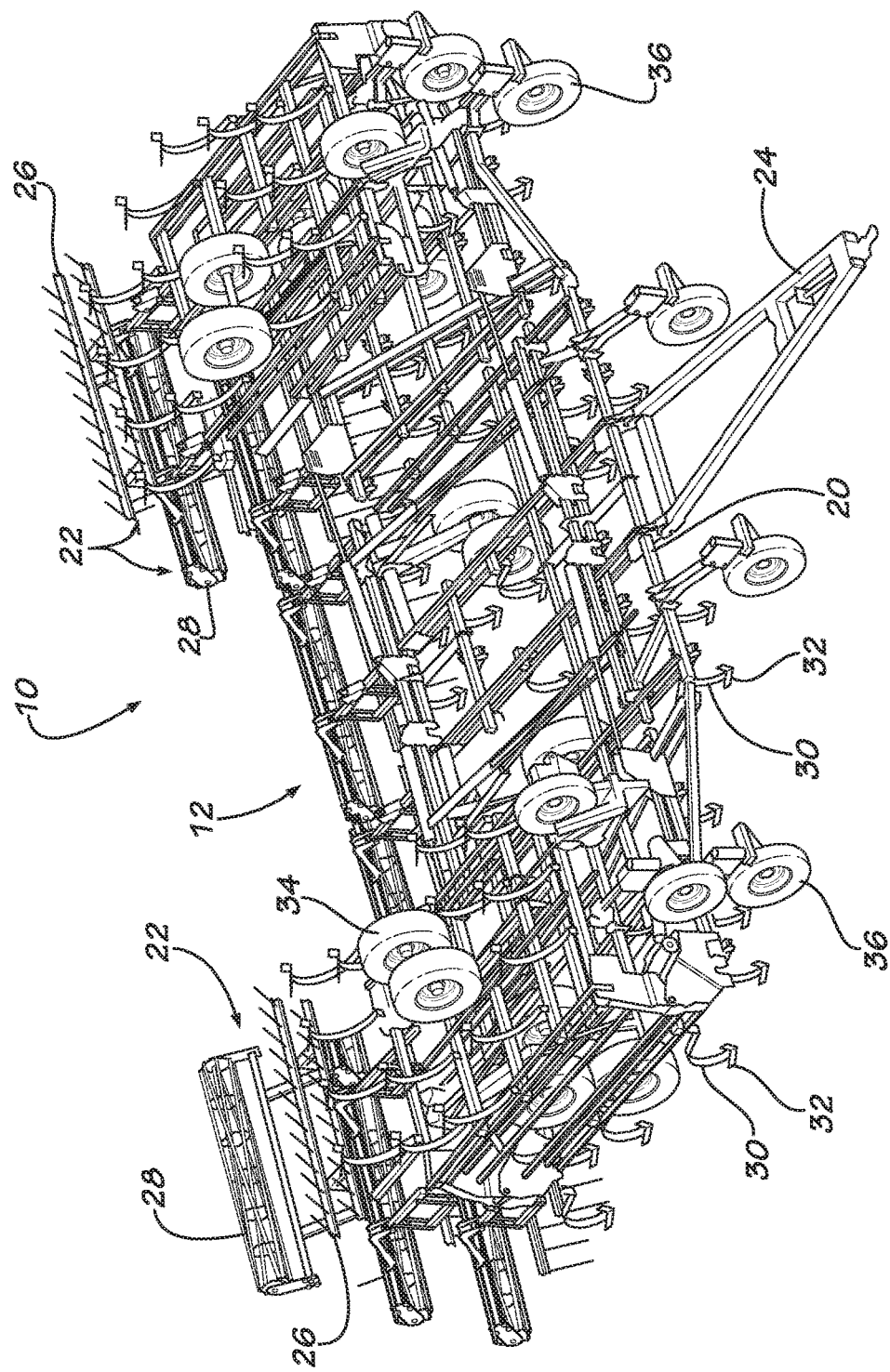
FIG. 5 is a top perspective view of the field cultivator shown in FIGS. 1-4, with the middle wing sections folded to a transport position.
Figure 6:
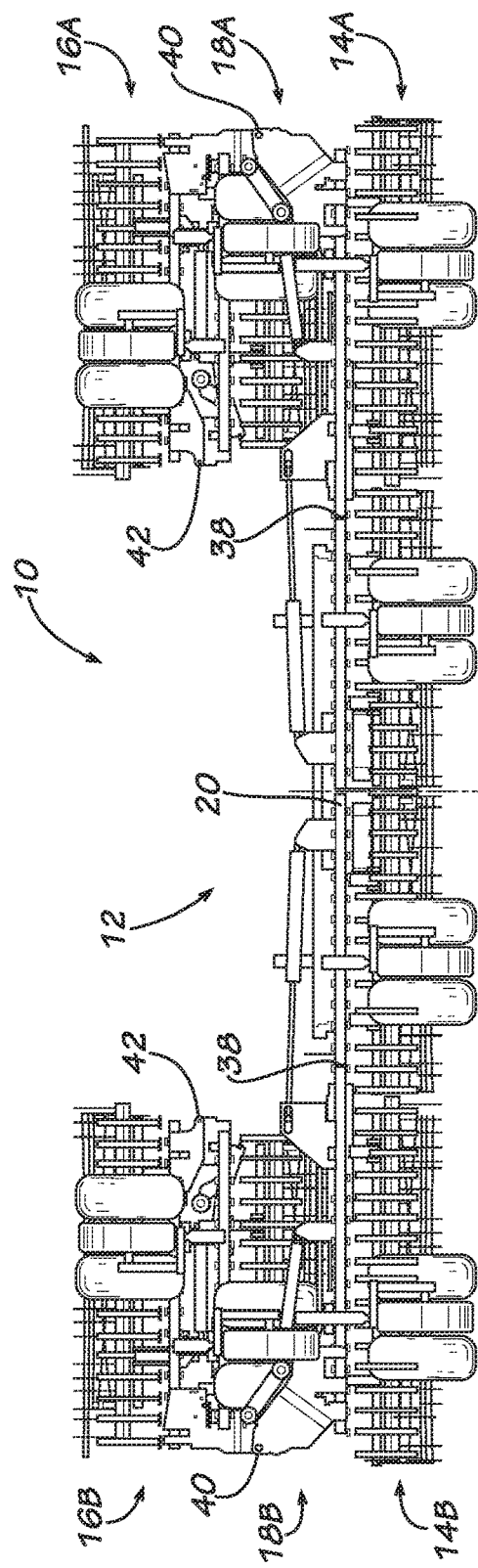
FIG. 6 is a front view of the field cultivator shown in FIG. 5, with the middle wing sections folded to the transport position.
Figure 7:
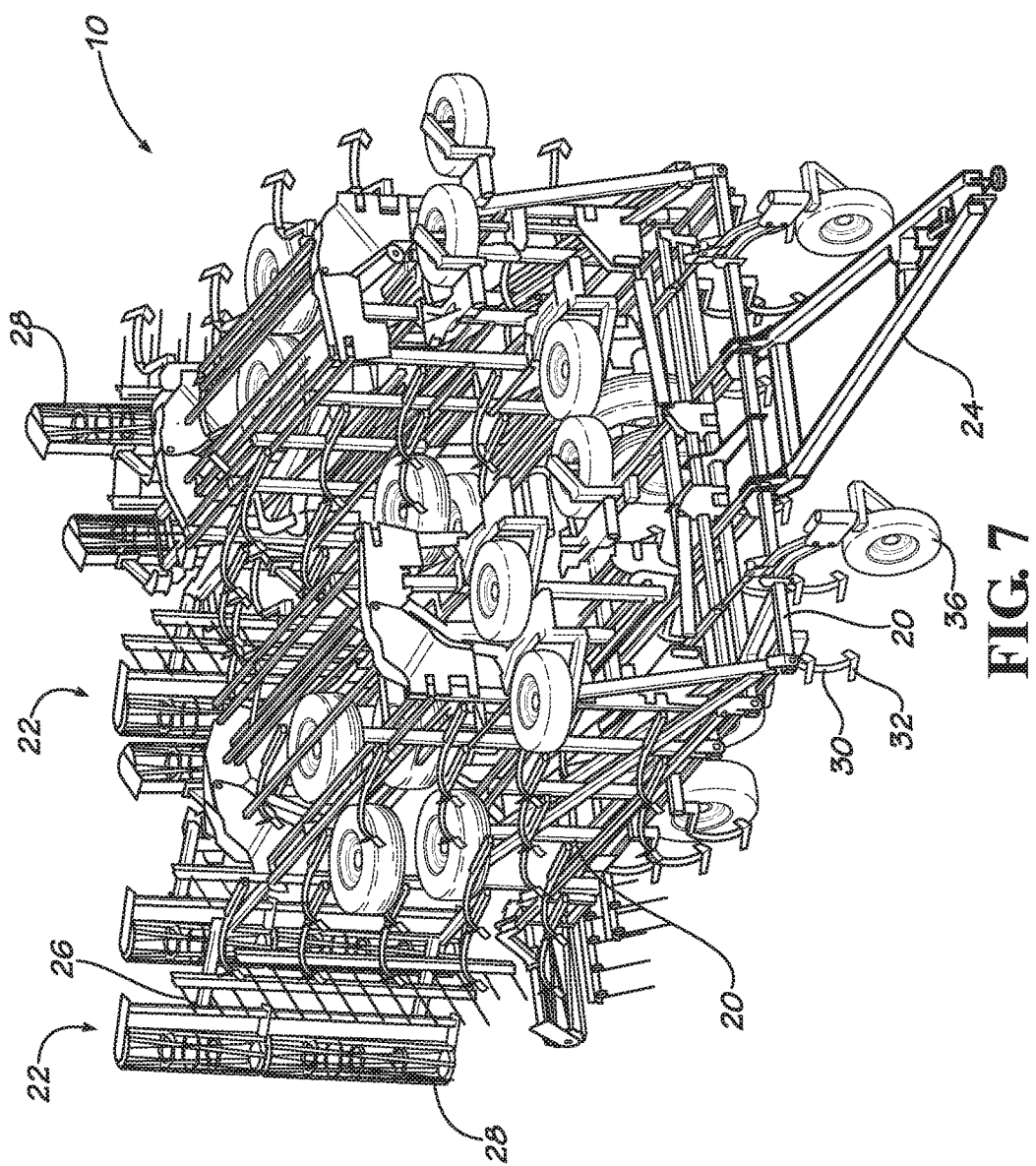
FIG. 7 is a top perspective view of the field cultivator shown in FIGS. 1-6, with the inner wing sections folded to a transport position.
Figure 8:
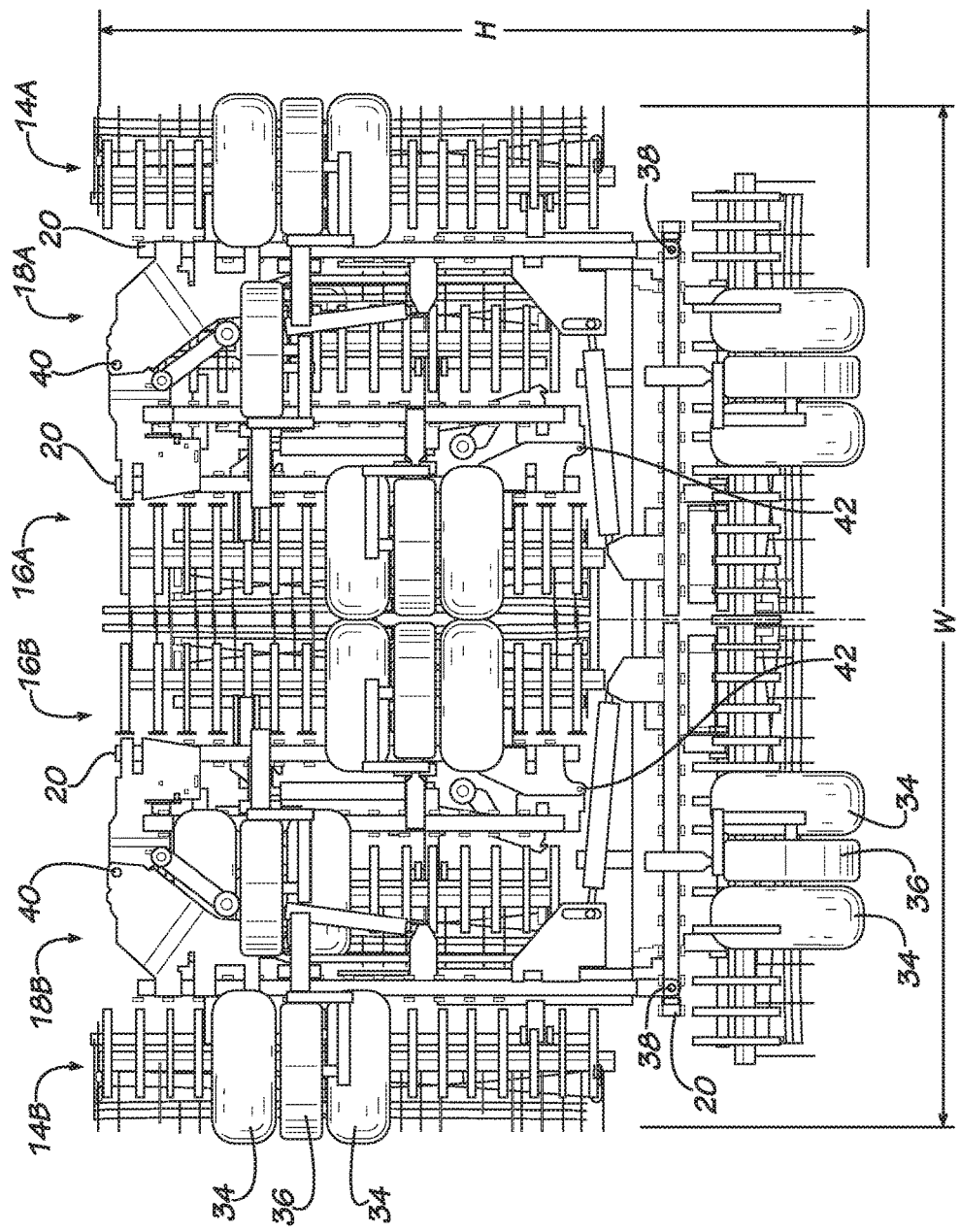
FIG. 8 is a front view of the field cultivator shown in FIG. 7, with the inner wing sections folded to the transport position.

During use, it is periodically necessary to move the field cultivator 10 from an unfolded (operating) position to a folded (transport) position. First, each outer wing section 18A and 18B is folded laterally inward and over a respective middle wing section 16A and 16B (FIGS. 3 and 4). With the outer wing sections 18A and 18B in the folded state, each middle wing section 16A and 16B is then folded laterally inward and over a respective inner wing section 14A and 14B (FIGS. 5 and 6). With the middle wing sections 16A and 16B in the folded state, each middle wing section 16A and 16B is then folded laterally inward and over the center frame section 12 (FIGS. 7 and 8). To unfold the field cultivator 10 and transform back to the field or operating position shown in FIGS. 1 and 2, the folding sequence described above is simply reversed.

The outer wing sections 18, middle wing sections 16 and inner wing sections 14 are stacked together in a vertically arranged stack over the center frame section 12 when in the folded state. To allow this type of nested stacking configuration, each of the wing sections 14, 16 and 18 have a pivot axis 38, 40 and 42, respectively, which is vertically offset to allow the wing sections to lie flat against the laterally inward shank frame 20/frame section 12 when in the folded state. The middle wing sections 16 have a pivot axis 40 that is vertically higher than pivot axes 38 and 42 of adjacent wing sections 14 and 18, when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be more strict concerning the height and width of vehicles which may travel on a road without being accompanied by an escort vehicle. With the triple-fold field cultivator 10 of the present invention, the overall frontal profile dimensions when in the folded state fit within regulatory requirements for both the US and Europe. More particularly, with all of the wing sections 14, 16 and 18 in the folded state, the field cultivator 10 is then in a transport position with an overall frontal profile having dimensions with a maximum width "W" of no greater than approximately 20 feet, preferably approximately 18 feet wide, and a height "H" of no greater than approximately 14 feet, preferably approximately 13 feet, 6 inches high (FIG. 8).

These maximum frontal profile dimensions include all of the shank frames 20, shanks 30, rear lift wheels 34 and front gauge wheels 36, when in the folded state. The rear auxiliary implements 22 are considered to be add-ons to the main field cultivator 10, and may be outside these overall frontal profile dimensions, at least if not folded upwardly for the transport position. However, it is the intention that all of field cultivator 10, including the rear auxiliary implements 22, be within these maximum frontal profile dimensions when in the transport position.

Figure 9:
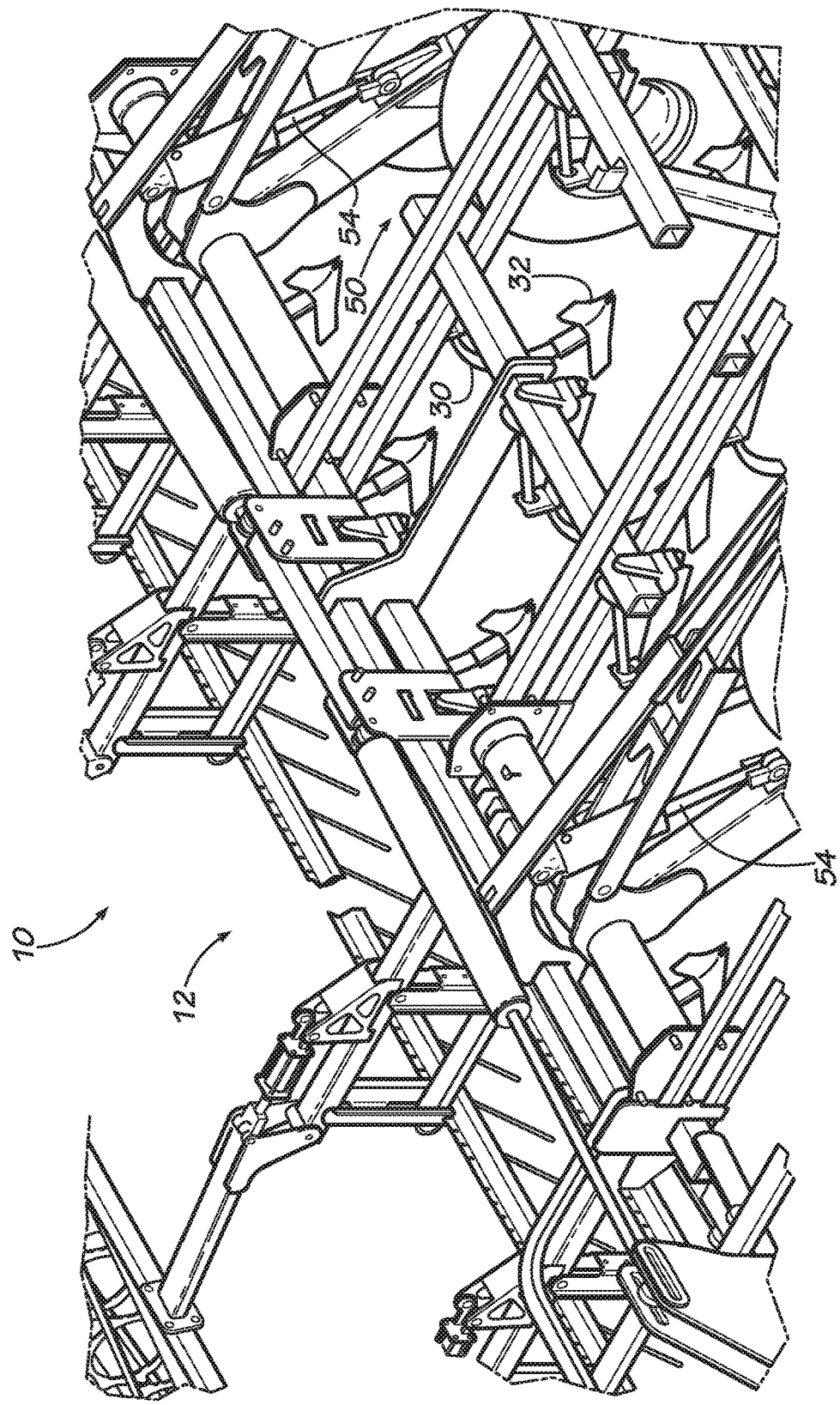
FIG. 9 is a perspective view of part of the main frame section of the field cultivator of FIGS. 1-8.
Figure 10:
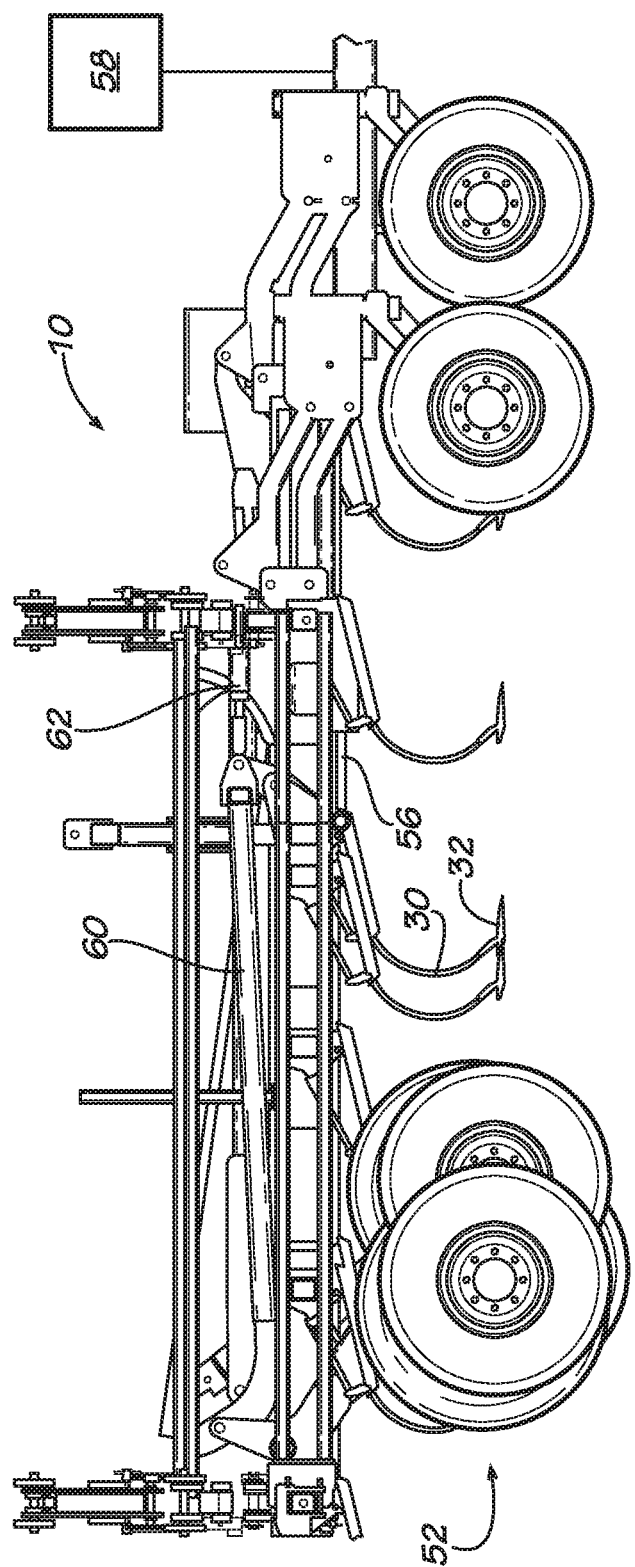
FIG. 10 is a side view of the field cultivator of FIGS. 1-9, with a primary focus on a wing section.

Now, additionally referring to FIGS. 9 and 10 there is shown further details of implement 10. Main section 12 is shown in FIG. 9 with wheel assemblies 50 having actuators 54, which provide depth level control for main section 12 when implement 10 is in field mode and support for the folded implement 10 while in transport mode.

A typical wheel assembly 52 is shown for one of the wing sections 14, 16 and 18 in FIG. 10. Wheel assemblies 52 include actuators 56, a linkage system 60 and an adjustable link 62. A controller 58 (shown abstractly in the figures) orchestrates the movement of wheel assemblies 50 and 52 in field and transport modes and during the transition to/from the field and transport modes.

Wheel assemblies 50 are shown having actuator 54 coupled more directly to the rear wheels and a linkage system is used to move the wheels that are to the fore of the rear wheels. Wheel assemblies 52 have actuator 56 positioned between the rear and fore wheels with linkage system 60 coupling both the rear and fore wheels for coordinated movement. Adjustable link 62 allows for an independent manual fore/aft leveling adjustment of each section.

Actuators 54 and 56, are under the independent and individual control of controller 58 so that sections 12-18 can each be individually adjusted for depth control of shovels 32 (which are tillage elements) of each section in a manner substantially independent of the other sections while in the field mode of operation. As implement 10 is transitioned from the field mode to the transport mode and the sections are being folded together, controller 58 causes wheel assemblies 52 to go from the fully extended position, as shown in FIG. 10 with actuator 56 fully extended, to being partially retracted as seen in the folded wing sections of FIG. 6. This effectively lowers the profile of each wing section 14-18 as the particular wing section is folded. While controller 58 may be a set of valves manually controlled by an operator, it is contemplated that controller 58 would be an electronic control system that controls the sequence of lowering the profile of each wing section, as it is being folded by the actuators used for the purpose of folding wing sections 14-18.

Controller 58 is programmed to prevent the wheels of the folded sections from being extended by the use of manual controls (not shown), which would cause interference with adjacent sections. This preclusion of the use of manual controls prevents damage that could otherwise occur. To the extent that interference or damage can occur by the improper positioning of the wheel assemblies during the folding process, before the section is fully folded, controller 58 likewise prevents the manual controls from overriding the process undertaken by controller 58.

The present invention advantageously orchestrates the lowering of the profile of each folding wing section in order to lower the overall profile of implement 10 is in the transport mode. The present invention uses a control system to choreograph the transition from the field mode to the transport mode, as the height profile of each section of wing sections 14-18 is controlled, as the sections are folded for transport and when the process is reversed as implement 10 transitions from the transport mode to the field mode.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling profile heights of a plurality of sections of tilling assemblies of an agricultural implement, the method comprising the steps of:
   providing the agricultural implement, the agricultural implement including
      a main center section including a pull hitch extending in a travel direction;
      a plurality of foldable wing sections coupled with the main center section, wherein the plurality of foldable wing sections includes a plurality of foldable wing sections on each side of the main center section, including an outer wing section furthest from the main section when in an operational field mode and an inner wing section closest to the main center section when in the operational field mode;
      a plurality of ground engaging tilling elements coupled to one of the main center section and the plurality of foldable wing sections;
      a plurality of wheel assemblies, each wheel assembly of the plurality of wheel assemblies including an actuator, the plurality of wheel assemblies including a first plurality of wheel assemblies associated with the main center section and a second plurality of wheel assemblies associated with each of the plurality of wing sections, wherein the actuators of the first plurality of wheel assemblies are independent of the actuators of the second plurality of wheel assemblies; and
      a control system operably connected to and configured to actuate the actuators to effect a profile minimizing operation of the foldable wing sections when the implement is being transitioned into a folded transport mode;
   actuating the actuators to effect a profile minimizing operation of a plurality of foldable wing sections of the agricultural implement when the agricultural implement is transitioning to a transport mode by
   moving each of the outer wing sections and folding each of the outer wing sections over each of the respective adjacent inner wing sections such that the outer wing sections and the inner wing sections are horizontally parallel to each other and form a folded group; and
   moving each folded group on each side of the main section inward over a portion of the main center section such that all of the plurality of wing sections are vertically parallel to each other in the folded transport mode.

2. The method of claim 1, further comprising the step of independently actuating the actuators to control a depth of tilling elements in each of the plurality of foldable sections of the agricultural implement when the agricultural implement is in a field mode.

3. The method of claim 2, wherein the controller independently actuates the actuators.

4. The method of claim 3, further comprising the step of precluding an operator via the controller from manually extending the wheel assembly associated with a wing section during the folding of the respective wing section into the transport mode.

* * * * *